United States Patent
Onai et al.

(10) Patent No.: US 11,954,509 B2
(45) Date of Patent: Apr. 9, 2024

(54) SERVICE CONTINUATION SYSTEM AND SERVICE CONTINUATION METHOD BETWEEN ACTIVE AND STANDBY VIRTUAL SERVERS

(71) Applicant: Nippon Telegraph and Telephone Corporation, Tokyo (JP)

(72) Inventors: Nobuo Onai, Tokyo (JP); Naoyuki Tanji, Tokyo (JP); Naoki Take, Tokyo (JP); Kensuke Takahashi, Tokyo (JP); Hiroyuki Tanaka, Tokyo (JP); Hiroshi Kato, Tokyo (JP); Hiroyuki Yazaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 817 days.

(21) Appl. No.: 17/053,628

(22) PCT Filed: Apr. 23, 2019

(86) PCT No.: PCT/JP2019/017292
§ 371 (c)(1),
(2) Date: Nov. 6, 2020

(87) PCT Pub. No.: WO2019/216210
PCT Pub. Date: Nov. 14, 2019

(65) Prior Publication Data
US 2021/0247996 A1    Aug. 12, 2021

(30) Foreign Application Priority Data

May 9, 2018 (JP) .................................. 2018-090437

(51) Int. Cl.
*G06F 9/455* (2018.01)
*G06F 11/07* (2006.01)
(Continued)

(52) U.S. Cl.
CPC ...... *G06F 9/45558* (2013.01); *G06F 11/0757* (2013.01); *G06F 11/1438* (2013.01);
(Continued)

(58) Field of Classification Search
CPC ............. G06F 9/45558; G06F 11/0757; G06F 11/1438; G06F 11/1484; G06F 2009/4557;
(Continued)

(56) References Cited

U.S. PATENT DOCUMENTS

| 6,625,751 B1 * | 9/2003 | Starovic | G06F 11/1484 |
| | | | 714/13 |
| 10,228,959 B1 * | 3/2019 | Anderson | G06F 9/546 |

(Continued)

FOREIGN PATENT DOCUMENTS

| JP | 2010-26714 | 2/2010 |
| JP | 2016-62140 | 4/2016 |

OTHER PUBLICATIONS

Takahashi et al., "Architecture for Flexible Service Cooperation Among Multiple Providers—A System Architecture for Flexible Coordination Fulfillment among Multiple Service Providers," 2017 IEICE Communications Society Conference, Sep. 12, 2017, 3 pages (with English Translation).

*Primary Examiner* — Michael W Ayers
(74) *Attorney, Agent, or Firm* — Fish & Richardson P.C.

(57) ABSTRACT

In a case where an active system virtual server detects stopping of a heartbeat received from a standby system virtual server, the active system virtual server notifies a coordination apparatus of the detection of the stopping of a heartbeat. In addition, the active system virtual server reports whether or not a service is operating to the coordination apparatus. The coordination apparatus instructs the standby system virtual server to restart the system in a case (Continued)

where the stopping of a heartbeat and the operation of a service are received. The standby system virtual server restarts the service, restarts an operating system, or restarts the operating system in a case where the restart of the service is not successful, in response to an instruction for restarting the system.

9 Claims, 6 Drawing Sheets

(51) Int. Cl.
*G06F 11/14* (2006.01)
*G06F 11/20* (2006.01)

(52) U.S. Cl.
CPC .. *G06F 11/1484* (2013.01); *G06F 2009/4557* (2013.01); *G06F 2009/45575* (2013.01); *G06F 2009/45591* (2013.01); *G06F 2009/45595* (2013.01); *G06F 11/20* (2013.01); *G06F 2201/815* (2013.01)

(58) Field of Classification Search
CPC . G06F 2009/45575; G06F 2009/45591; G06F 2009/45595; G06F 2201/815; G06F 11/20
See application file for complete search history.

(56) References Cited

U.S. PATENT DOCUMENTS

| | | | |
|---|---|---|---|
| 11,025,483 B1* | 6/2021 | Hashmi | H04L 63/164 |
| 2010/0318991 A1* | 12/2010 | Venkitachalam | G06F 11/0766 |
| | | | 718/1 |

\* cited by examiner

SERVICE CONTINUATION SYSTEM AND SERVICE CONTINUATION METHOD BETWEEN ACTIVE AND STANDBY VIRTUAL SERVERS

CROSS-REFERENCE TO RELATED APPLICATIONS

This application is a National Stage application under 35 U.S.C. § 371 of International Application No. PCT/JP2019/017292, having an International Filing Date of Apr. 23, 2019, which claims priority to Japanese Application Serial No. 2018-090437, filed on May 9, 2018. The disclosure of the prior application is considered part of the disclosure of this application, and is incorporated in its entirety into this application.

TECHNICAL FIELD

The present disclosure relates to a service continuation system and a service continuation method for realizing a high availability system on a cloud.

BACKGROUND ART

Communication carriers are required to be able to cooperate with business to business to X (B2B2X) that provides a new service by combining various services (wholesale services) such as a network, a virtual server, a storage, and a web servers which are provided by a network provider or a cloud provider. A service provider may request a service from a coordination apparatus (coordination service) provided by a communication carrier, and the coordination apparatus combines wholesale services using application programming interfaces (APIs) of the wholesale services to construct a service and provides the service to an end user (see Non Patent Literature 1).

On the other hand, a mission critical service using a network is required to be provided for 24 hours 365 days without interruption even when a hardware failure or a software defect has occurred. Such a service adopts a high availability cluster configuration capable of duplicating a network or hardware into an active system and a standby system and performing switching to the standby system in a case where a failure occurs in the active system to continue providing a service.

In a high availability duster configuration, switching to the standby system is performed at the time of detecting a failure (stopping of a service or a server) by monitoring a process of providing a service or monitoring a server using a heartbeat. When switching is performed, a service of the active system is stopped in order to prevent duplicate operation of a service and duplicate use of a network address.

However, when a failure occurs in a network (interconnect) that transfers a heartbeat, the heartbeat is stopped and a service in the standby system operates regardless of the operation of the service of the active system, which results in a problem of a split-brain in which a service operates in duplicate. In addition, the occurrence of a failure in a service of the active system and the occurrence of a service stop failure in which a service cannot be stopped in spite of an attempt to stop the service results in a problem that switching to the standby system cannot he performed. In such a case, a server of the active system or the standby system is physically stopped or restarted using an intelligent platform management interface (IPMI).

CITATION LIST

NON PATENT LITERATURE

Non Patent Literature 1: Kensuke Takahashi et al., "Architecture for making service coordination between multiple providers flexible," 2017 IEICE Communications Society Conference, B-14-8, P. 245, Sep. 12, 2017.

SUMMARY OF THE INVENTION

TECHNICAL PROBLEM

In a case where a coordination apparatus provides a service of a high availability cluster configuration, it is conceivable to configure a high availability cluster on a cloud by to duplicate virtual machines instead of physical servers. However, even when there is an attempt to apply the related art to a virtual machine, an interface operating a physical machine, such as an IPMI, is not provided as an API of a wholesale service in a service provided by a virtual machine. This leads to a problem of a split-brain or a problem that it is not possible to cope with a service stop failure. Even when an API is provided, it will depend on a cloud provider that provides a virtual machine service.

The present disclosure is contrived in view of such circumstances, and an object of the present disclosure is to provide a service continuation system and a service continuation method that make it possible to cope with a split-brain problem and a service stop failure in a high availability cluster configuration on a cloud.

MEANS FOR SOLVING THE PROBLEM

In order to solve the above-described problem, the invention according to a first aspect is a service continuation system including an active system virtual server configured to provide a service through a network, a standby system virtual server configured to transmit a heartbeat to and from the active system virtual server and provide the service in a case where a heartbeat from the active system virtual server is stopped, and a coordination apparatus which is communicatively connected to the active system virtual server and the standby system virtual server, in which the active system virtual server includes an active system service unit configured to provide the service, an active system node monitoring unit configured to notify the coordination apparatus of the stopping of a heartbeat in a case where a heartbeat from the standby system virtual server is not received for a predetermined period of time, and an active system service monitoring unit configured to report whether or not the active system service unit is operating to the coordination apparatus, the standby system virtual server includes a standby system service unit configured to provide the service, and a standby system service recovery unit configured to execute any one of restart of the standby system service unit, restart of an operating system of the standby system virtual server, and both restart of the standby system service unit and restart of the operating system of the standby system virtual server after the restart of the standby system service unit is not successful, in a case where an instruction for restarting the system is received from the coordination apparatus, and the coordination apparatus includes a coordination control unit configured to instruct the standby system virtual server to restart the system in a case where the stopping of a heartbeat is received and a report indicating that the active system service unit is operating is received from the active system virtual server.

In addition, the invention according to an eighth aspect is a service continuation method of a service continuation system including an active system virtual server configured to provide a service through a network, a standby system virtual server configured to transmit a heartbeat to and from the active system virtual server and provide the service in a case where a heartbeat from the active system virtual server is stopped, and a coordination apparatus which is communicatively connected to the active system virtual server and the standby system virtual server, the service continuation method including, at the active system virtual server, providing the service, notifying the coordination apparatus of the stopping of a heartbeat in a case where a heartbeat from the standby system virtual server is not received for a predetermined period of time, and report whether or not the service is operating to the coordination apparatus, at the standby system virtual server, executing any one of restart of the service of the standby system virtual server, restart of an operating system of the standby system virtual server, and both restart of the service of the standby system virtual server and restart of the operating system of the standby system virtual server after the restart of the service of the standby system virtual server is not successful, in a case where an instruction for restarting the system is received from the coordination apparatus, and at the coordination apparatus, instructing the standby system virtual server to restart the system in a case where the stopping of a heartbeat is received and a report indicating that the service is operating is received from the active system virtual server.

With such a configuration, the service continuation system can avoid a split-brain problem by restarting the standby system system in a case where the active system virtual server does not receive a heartbeat and the service is operating. In addition, the service continuation system can restart the standby system in a short period of time and restart the system while avoiding damage to the system due to forcible stopping, in contrast with a case where the standby system virtual server is restarted.

The invention according to a second aspect is the service continuation system according to the first aspect, in which in a case where the standby system service recovery unit fails in the restart of the operating system of the standby system virtual server, the coordination apparatus instructs a management system in a virtualization environment in which the standby system virtual server is operated to restart the standby system virtual server.

With such a configuration, the service continuation system can forcibly restart the standby system virtual server in a case where the restart avoiding system destruction due to forcible stop in the standby system system is not successful.

The invention according to a third aspect is the service continuation system according to the first aspect, in which the active system virtual server further includes an active system service recovery unit, the active system service monitoring unit detects a service stop failure indicating that the active system service unit is not able to stop the service and notifies the coordination apparatus of the detection of the service stop failure, the coordination control unit instructs the active system virtual server to stop the system in a case where the service stop failure is received from the active system virtual server, and the active system service recovery unit executes stopping of the operating system of the active system virtual server in a case where an instruction for stopping the system is received from the coordination apparatus.

With such a configuration, the service continuation system can cope with a service stop failure by stopping the system while avoiding a split-brain problem and avoiding system destruction due to forcible stop in a case where a service cannot be stopped in the active system virtual server.

The invention according to a fourth aspect is the service continuation system according to the third aspect, in which in a case where the active system service recovery unit fails in the stop of the operating system of the active system virtual server, the coordination apparatus instructs a management system in a virtualization environment in which the active system virtual server is operated to stop the active system virtual server.

With such a configuration, the service continuation system can forcibly stop the active system virtual server in a case where the stopping for avoiding system destruction due to forcible stop in the active system system is not successful.

The invention according to a fifth aspect is a service continuation system including an active system virtual server configured to provide a service through a network, a standby system virtual server configured to transmit a heartbeat to and from the active system virtual server and provide the service in a case where a heartbeat from the active system virtual server is stopped, and a coordination apparatus which is communicatively connected to the active system virtual server and the standby system virtual server, in which the active system virtual server includes an active system service unit configured to provide the service, an active system service monitoring unit configured to detect a service stop failure indicating that the active system service unit is not able to stop the service and notifies the coordination apparatus of the detection of the service stop failure, and an active system service recovery unit configured to execute stopping of an operating system of the active system virtual server in a case where an instruction for stopping the system is received from the coordination apparatus, and the coordination apparatus includes a coordination control unit configured to instruct the active system virtual server to stop the system in a case where the service stop failure is received from the active system virtual server.

With such a configuration, the service continuation system can cope with a service stop failure by stopping the system while avoiding system destruction due to forcible stop in a case where a service cannot be stopped in the active system virtual server.

The invention according to a sixth aspect is a service continuation system including an active system virtual server configured to provide a service through a network; and a standby system virtual server configured to transmit a heartbeat to the active system virtual server and provide the service in a case where a heartbeat from the active system virtual server is stopped, in which the active system virtual server includes a control unit configured to execute any one of instructing the standby system virtual server to restart the system, instructing a management system in a virtualization environment in which the standby system virtual server is operated to restart the standby system virtual server, and both instructing the standby system virtual server to restart the system and instructing the management system in the virtualization environment in which the standby system virtual server is operated to restart the standby system virtual server after the restart of the system is not successful, in a case where the active system virtual server does not receive a heartbeat from the standby system virtual server for a predetermined period of time and the service is operating, and the standby system virtual server includes a control unit configured to execute any one of restart of a process for providing the service, restart of an operating system of the standby system virtual server, and both restart of the process for providing the service and restart of the operating system of the standby system virtual server after the restart of the process is not successful, in a case where an instruction for restarting the system is received.

With such a configuration, the service continuation system can avoid a split-brain problem by restarting the standby system system in a case where the active system virtual server does not receive a heartbeat and the service is operating. In addition, the service continuation system can restart the standby system in a short period of time, restart the system while avoiding damage to the system due to forcible stopping, and forcibly restart the system in a case where the system cannot be restarted, in contrast with a case where the standby system virtual server is restarted.

The invention according to a seventh aspect is a service continuation system including an active system virtual server configured to provide a service through a network, and a standby system virtual server configured to transmit a heartbeat to the active system virtual server and provide the service in a case where a heartbeat from the active system virtual server is stopped, in which the active system virtual server includes an active system service unit configured to provide the service, an active system service monitoring unit configured to detect a service stop failure indicating that the active system service unit is not able to stop the service, and an active system service recovery unit configured to execute any one of stopping an operating system of the active system virtual server and instructing a management system in a virtualization environment in which the active system virtual server is operated to stop the active system virtual server, in a case where the active system service monitoring unit has detected the service stop failure.

With such a configuration, the service continuation system can cope with a service stop failure by stopping the active system system while avoiding system destruction due to forcible stop or by forcibly stopping the active system virtual server, in a case where a service cannot be stopped in the active system virtual server.

EFFECTS OF THE INVENTION

According to the present disclosure, it is possible to provide a service continuation system and a service continuation method that make it possible to cope with a split-brain problem and a service stop failure in a high availability cluster configuration on a cloud.

DESCRIPTION OF EMBODIMENTS

Prior to describing an embodiment of the present disclosure, switching processing, a split-brain problem, and a service stop failure in a high availability cluster configuration of the related art will be described.

Configuration of High Availability Cluster of Related Art

Figure 1:
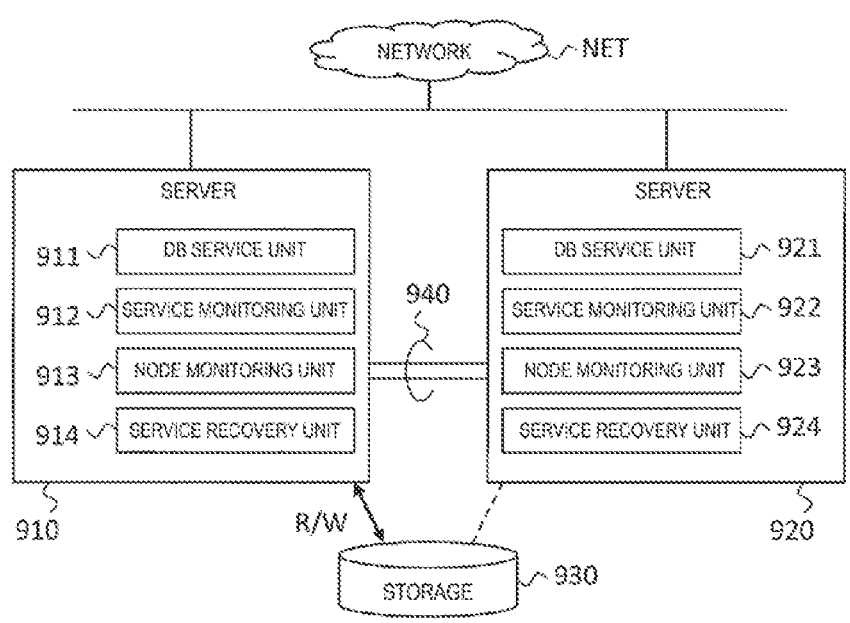
FIG. 1 is a diagram illustrating a high availability cluster configuration in the related art.

FIG. 1 is a diagram illustrating a high availability cluster configuration in the related art. A high availability cluster configuration of a physical server providing a database service will be described with reference to FIG. 1. A server 910 is a server of an active system, and a server 920 is a server of a standby system. The server 910 and the server 920 are connected to each other through an interconnect 940 and transmit a heartbeat to each other to confirm that the opponent server is operating. The interconnect 940 is typically constituted by two or more networks. In addition, the server 910 and the server 920 are connected to an external network NET and can communicate with a terminal (not shown) that requests a service.

The server 910 and the server 920 respectively include database service units (described as a database (DB) service unit in FIG. 1) 911 and 921, service monitoring units 912 and 922, node monitoring units 913 and 923, and service recovery units 914 and 924. First, a configuration of the server 910 of the active system will be described, and then a configuration of the standby system server 920 will be described.

The database service unit 911 of the server 910 of the active system is an operating service (process) for receiving a request from a terminal connected to the network NET and providing a database service.

The service monitoring unit 912 is a process (agent) for monitoring to ensure that the database service unit 911 is operating. The service monitoring unit 912 confirms and monitors that the database service unit 911 is operating by periodically transmitting a query to the database service unit 911, or the like. In a case where the operation of the database service unit 911 cannot be confirmed, the service monitoring unit 912 determines that a failure has occurred and notifies the service recovery unit 914 to he described later of the occurrence of the failure.

The node monitoring unit 913 transmits and receives a heartbeat to and from the server 920 through the interconnect 940 to confirm that the server 920 of the standby system is operating.

The service recovery unit 914 executes the switching of a server to he described later in a case where a failure has occurred.

Next, a configuration of the server 920 of the standby system will be described, The database service unit 921 is a service (process) for providing a service in a case where a failure has occurred in the database service unit 911 of the server 910 of the active system. The database service unit 921 may start up a process at the time of switching to start a service or may start a service after switching due to a started-up process standing by.

The service monitoring unit 922 is a process (agent) for monitoring to ensure that the database service unit 921 is operating.

The node monitoring unit 923 transmits and receives a heartbeat through the interconnect 940 to confirm that the server 910 is operating. Further, in a case where the node monitoring unit 923 has not received a heartbeat, the node monitoring unit 923 determines that a failure has occurred. in the server 910 and notifies the service recovery unit 924 to be described later of the occurrence of the failure.

The service recovery unit 924 executes the switching of a server to he described later in a case where a failure has occurred in the server 910 of the active system.

The storage 930 is an apparatus which is connected to the server 910 of the active system and stores data from a database service.

Switching Processing: Occurrence of Failure in Service

Hereinafter, switching processing (failover) in a case where a failure has occurred in the database service unit 911 or the server 910 of the active system will be described.

Figure 2:
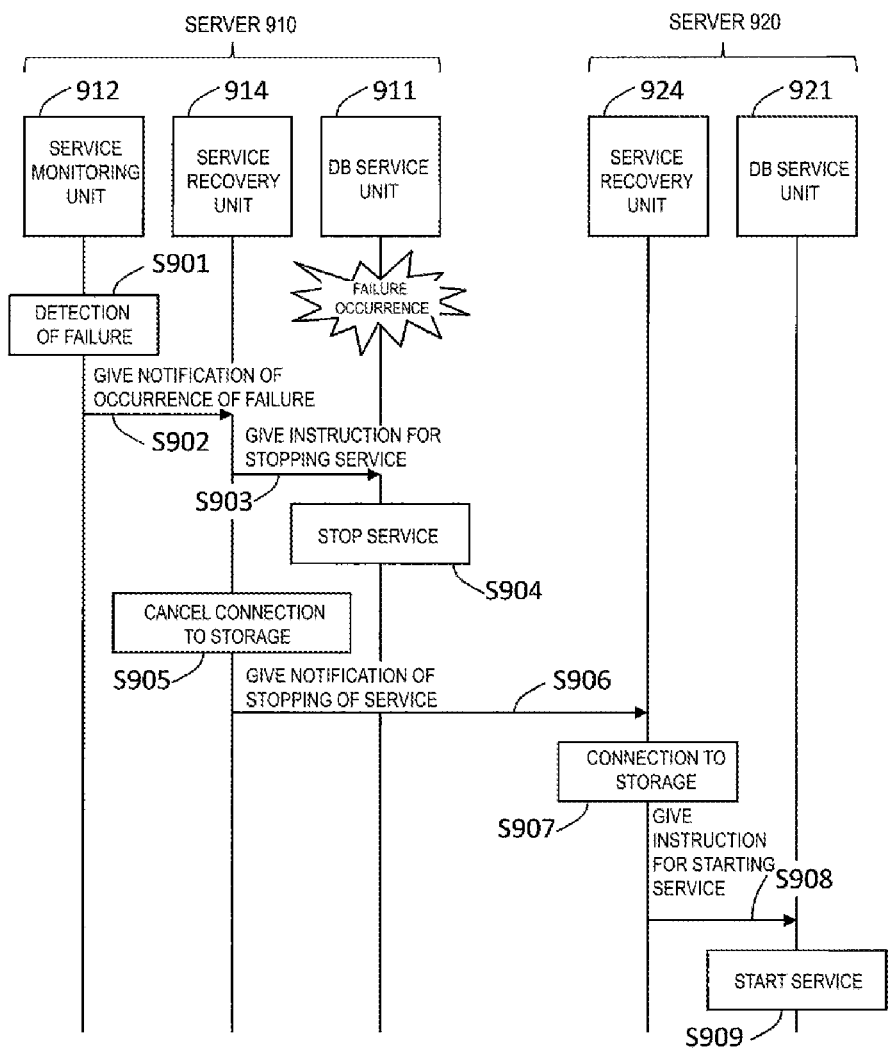
FIG. 2 is a sequence diagram of processing for switching a server of an active system to a server of a standby system in a case where a failure occurs in a database service unit of an active system in the related art.

FIG. 2 is a sequence diagram of processing for switching the server 910 of the active system to the server 920 of the standby system in a case where a failure has occurred in the database service unit 911 of the active system in the related art. Switching processing in the case of a service failure will be described with reference to FIG. 2.

When a failure occurs in the database service unit 911 of the server 910 of the active system, the service monitoring unit 912 detects the failure (step S901) and notifies the service recovery unit 914 of the detection of the failure (step S902). Next, the service recovery unit 914 instructs the database service unit 911 to stop (step S903). After the database service unit 911 has stopped (step S904), the service recovery unit 914 cancels the connection to the storage 930 (step S905) to notify the server 920 of the standby system that the service of the server 910 is stopped (step S906).

The service recovery unit 924 of the server 920 of the standby system is connected to the storage 930 (step S907) to instruct the database service unit 921 to start a service (step S908). The database service unit 921 starts a service (step S909), so that the switching is completed.

Figure 3:
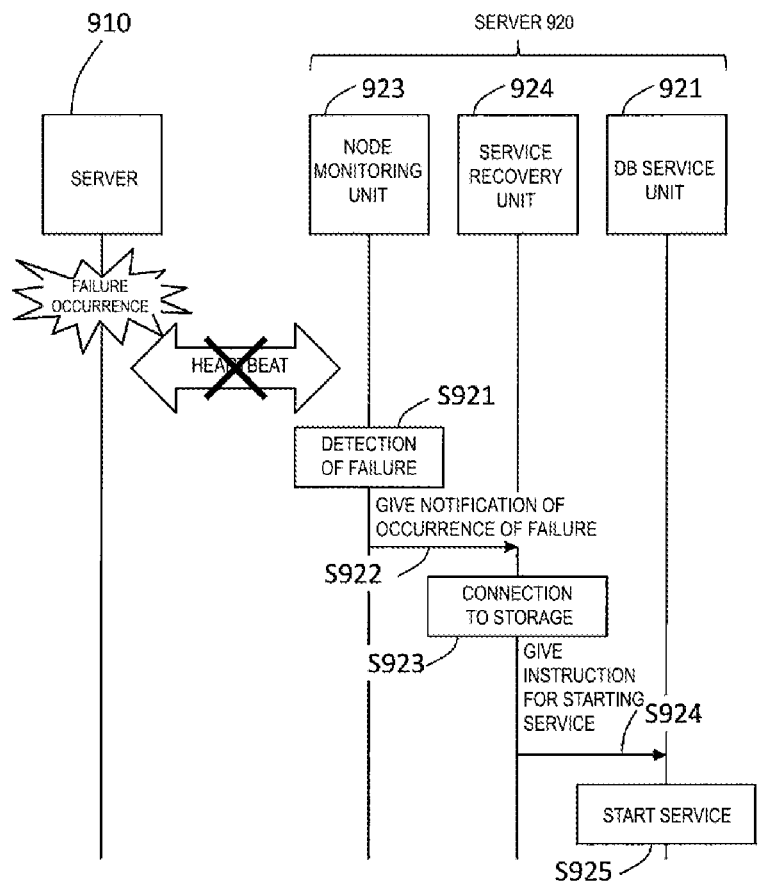
FIG. 3 is a sequence diagram of processing for switching a server of an active system to a server of a standby system in a case where a failure occurs in a server of an active system in the related art.

In the above-described switching processing, the server 910 of the active system has given the notification to the server 920 of the standby system after the service has stopped (see step S906), but may stop to transmit a heartbeat without giving a notification. As illustrated in FIG. 3 to be described later, switching processing is executed by the server 920 of the standby system without giving a notification of the stopping of a service by stopping a heartbeat.

Switching Processing: Occurrence of Failure in Server

FIG. 3 is a sequence diagram of processing for switching the server 910 of the active system to the server 920 of the standby system in a case where a failure has occurred in the server 910 of the active system in the related art. Switching processing in the case of a server failure will be described with reference to FIG. 3.

When a heartbeat is not received from the server 910, the node monitoring unit 923 of the server 920 of the standby system detects a failure of the server 910 (step S921) and notifies the service recovery unit 924 of the detection of the failure (step S922). Next, the service recovery unit 924 is connected to the storage 930 (step S923) to instruct the database service unit 921 to start a service (step S924). The database service unit 921 starts a service (step S925), so that the switching (failover) is completed.

Split Brain Problem and Coping Processing

Next, a split-brain problem occurring in a case where a failure has occurred in the interconnect 940 will be described. When a failure occurs in the interconnect 940, the server 920 of the standby system determines that the server 910 of active system has failed (see step S921) as illustrated in FIG. 3, and starts a service (see step S925). However, a service is also operating in the server 910 of the active system, and thus a service of a database is operating in duplicate, which results in a split-brain problem that data is damaged due to both the servers 910 and 920 performing writing in the storage 930. This is also a problem that the exclusive control between the server 910 and the server 920 is not performed on the storage 930.

In the related art, the service recovery unit 914 of the server 910 of the active system forcibly restarts the server 920 of the standby system using an IPMI in order to avoid duplicate operation of a service in a case where a heartbeat is stopped and a service is operating. Meanwhile, the server 920 of the standby system after being restarted is set not to enter a failover mode even when a heartbeat from the server 910 of the active system is stopped.

Service Stop Failure and Coping Processing

Next, a service (resource) stop failure will be described with reference to FIG. 2. When a failure occurs in the database service unit 911, the service recovery unit 914 stops a service (see steps S903 and S904). However, the failed database service unit 911 may not stop (a service cannot be stopped) and may fail into a hang-up state. This is a service stop failure. When a service stop failure occurs, the server 910 remains connected to the storage 930. For this reason, switching to the server 920 of the standby system cannot be performed, which leads to a state where a service is stopped.

In the related art, the service recovery unit 914 of the server 910 switches to the server 920 of the standby system by stopping or restarting the server 910 itself using an IPMI. A switching procedure is as illustrated in FIG. 3 (a heartbeat is stopped due to the stopping or restart of the server 910, and the process of step S921 and the subsequent processes are started).

Problem When Related Art is Applied to Virtual Machine on Cloud An interface for operating a physical machine such as an IPMI is not provided as an API of a wholesale service in a provision service of a virtual machine, which results in a split-brain problem or a problem that it is not possible to cope with a service stop failure. Even when an API is provided, it will depend on a cloud provider that provides a virtual machine service.

Overall Configuration of Embodiment of Present Disclosure

Figure 4:
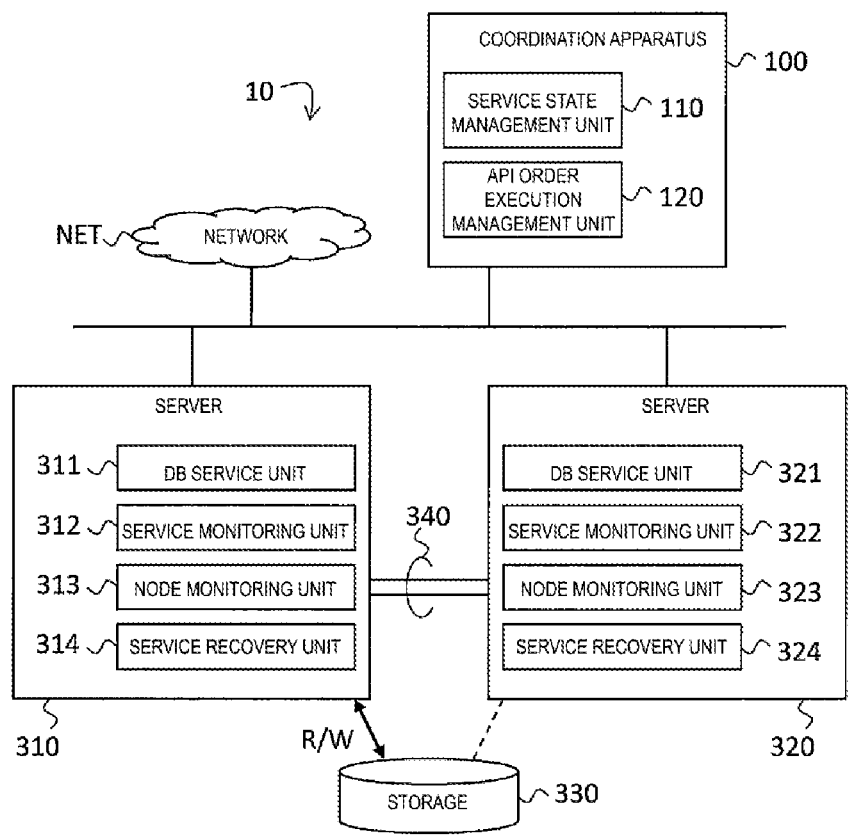
FIG. 4 is a diagram illustrating an overall configuration of a service continuation system according to the present embodiment.

Hereinafter, the service continuation system in a mode (embodiment) for implementing the present disclosure will be described. FIG. 4 is a diagram illustrating an overall configuration of the service continuation system 10 according to the present embodiment. The service continuation system 10 is configured to include a coordination apparatus 100, a server of an active system (active system virtual server) 310, and a server of a standby system (standby system virtual server) 320.

The servers 310 and 320 are virtual machines provided by a cloud provider, and include a virtual central processing unit (CPU), memory, and communication interface which are not illustrated in the drawing. The server 310 and the server 320 are connected to each other through an interconnect 340 and transmit a heartbeat to each other to confirm that the opponent server is operating. The server 310 and the server 320 are connected to the network NET and can communicate with a terminal that requests a service or a server of a wholesale service.

A storage 330 is an apparatus that stores data of a database service connected to the server 310 of the active system, or a service of a storage.

Overall Configuration of Server of Active System

The server 310 of the active system includes a database service unit 311, a service monitoring unit 312, a node monitoring unit 313, and a service recovery unit 314 which are operated by a virtual CPU (control unit).

The database service unit (active system service unit) 311 is the same as the database service unit 911 illustrated in FIG. 1.

Similarly to the service monitoring unit 912 illustrated in FIG. 1, the service monitoring unit (active system service monitoring unit) 312 monitors the operation of the database service unit 311. In a case where the operation of the database service unit 311 cannot be confirmed, the service monitoring unit 312 determines that a failure has occurred, and notifies the service recovery unit 314 of the occurrence of the failure. As a function different from the service monitoring unit 912, the service monitoring unit (active system service monitoring unit) 312 reports operation conditions of the database service unit 311 with respect to an inquiry received from the coordination apparatus 100. Further, in a case where a service stop failure occurs in the database service unit 311, the coordination apparatus 100 is notified of the occurrence of the service stop failure.

Similarly to the node monitoring unit 913 illustrated in FIG. 1, the node monitoring unit (active system node monitoring unit) 313 transmits and receives a heartbeat to confirm that the server 320 of the standby system is operating. In a case where a heartbeat is not received for a predetermined period of time, the node monitoring unit (active system node monitoring unit) 313 notifies the coordination apparatus 100 that a heartbeat is not received.

Similarly to the service recovery unit 914 illustrated in FIG. 1, the service recovery unit (active system service recovery unit) 314 executes server switching in a case where a failure has occurred. In addition, the database service unit 311 and an operating system (OS, not illustrated) of the server 310 are stopped in response to an instruction received from the coordination apparatus 100.

Overall Configuration of Server of Standby System

Next, a configuration of the server 320 of the standby system will be described. The server 320 includes a database service unit (standby system service unit) 321, a service monitoring unit (standby system service monitoring unit) 322, a node monitoring unit (standby system node monitoring unit) 323, and a service recovery unit (standby system service recovery unit) 324 which are operated by a virtual CPU (control unit), and have the same configurations as those of the database service unit 921, the service monitoring unit 922, the node monitoring unit 923, and the service recovery unit 924 which are illustrated in FIG. 1, respectively. However, the service recovery unit 324 has a function of restarting the database service unit 321 in response to an instruction received from the coordination apparatus 100.

When a failure occurs in the server 310 of the active system, switching to the server 320 of the standby system is performed, and the failure of the server 310 is removed and a standby state is set, the active system and the standby system are switched. The database service units 311 and 321, the service monitoring units 312 and 322, the node monitoring units 313 and 323, and the service recovery units 314 and 324 are described separately, but the every two units have the same function.

Configurations of Other Servers

Although a high availability cluster configuration of a server providing a database service is described above, servers of other services, such as a web server and a virtual terminal server, also have the same configuration except that the database service units 311 and 321 are replaced. In addition, the server 310 and the server 320 may include a network monitoring unit that monitors the network NET and give a notification to the service recovery units 314 and 324 when a failure occurs. Further, regarding a storage, a storage monitoring unit having the same function may be included.

Coordination Apparatus

The coordination apparatus 100 receives a notification of a failure from the servers 310 and 320 and gives an instruction for stopping or restarting a service or a server. The coordination apparatus 100 is not limited to a physical server and may be a virtual machine. In addition, the coordination apparatus 100 may be a virtual machine of the same cloud provider as those of the servers 310 and 320 or may be a virtual machine of another cloud provider.

The coordination apparatus 100 includes a service state management unit 110 and an API order execution management unit 120. Meanwhile, the service state management unit 110 and the API order execution management unit 120 are also collectively referred to as a coordination control unit.

The service state management unit 110 receives a notification of a failure from the servers 310 and 320, and inquires operation conditions of a service from the servers 310 and 320. Further, the API order execution management unit 120 is instructed to stop or restart a server or a service in accordance with operation conditions.

The API order execution management unit 120 receives an instruction from the service state management unit 110 and instructs the servers 310 and 320 to stop or restart a server or a service.

Switching Processing

Switching processing in the service continuation system 10 in a case where a split-brain problem and a service stop failure do not occur is similar to the switching processing in the related art which is described in FIGS. 2 and 3. Hereinafter, processing in a case where a split-brain problem has occurred (see FIG. 5 to be described later) and switching processing in a case where a service stop failure has occurred (see FIG. 6 to be described later) will be described.

Coping with Split Brain Problem

Figure 5:
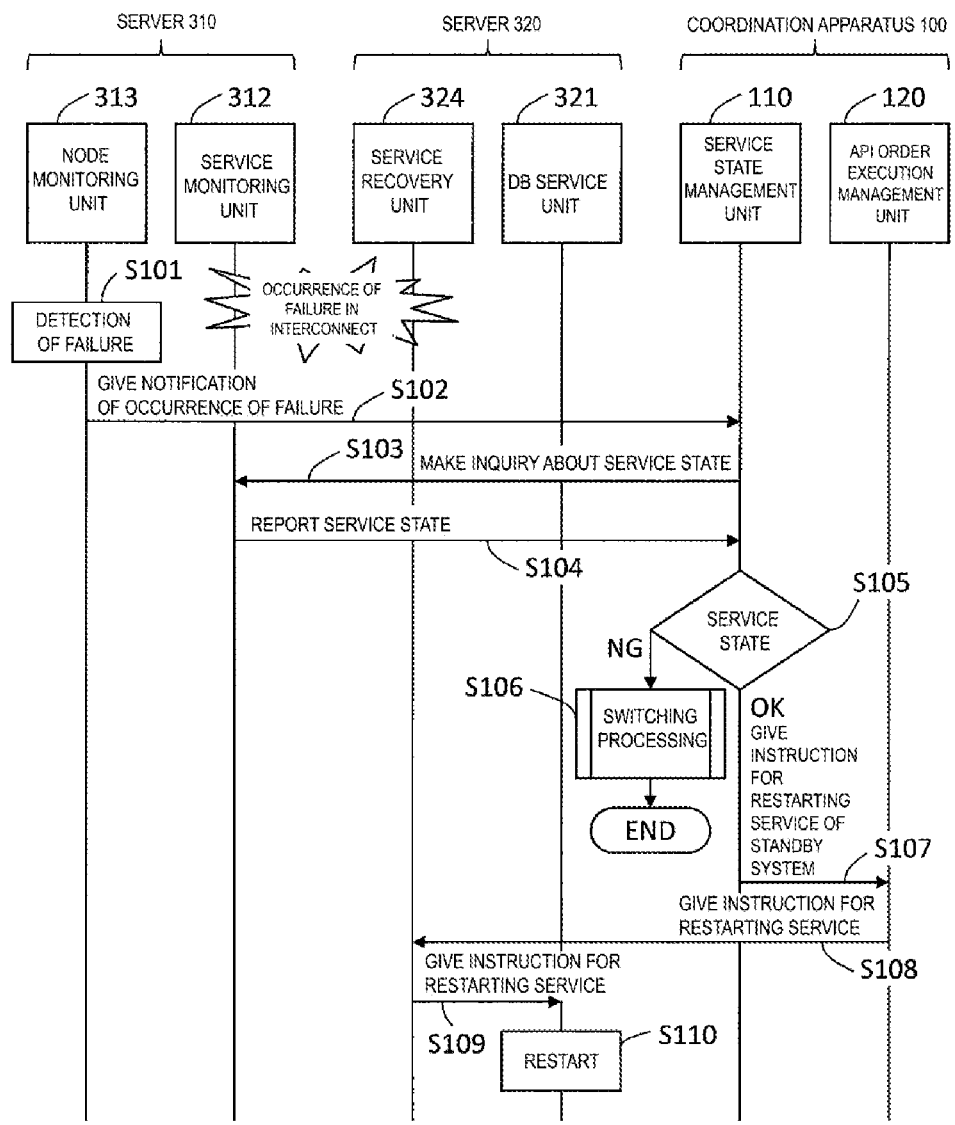
FIG. 5 is a sequence diagram illustrating coping processing when a split-brain problem of the service continuation system according to the present embodiment occurs.

FIG. 5 is a sequence diagram illustrating coping processing when a split-brain problem of the service continuation system 10 according to the present embodiment occurs. A flow of processing after a heartbeat is stopped due to a failure having occurred in the interconnect 340 (see FIG. 4) through which a heartbeat is transmitted and received between the server 310 of the active system and the server 320 of the standby system will be described with reference to FIG. 5.

In step S101, the node monitoring unit 313 of the server 310 of the active system detects that a failure has occurred when a heartbeat is not received for a predetermined period of time. In step S102, the node monitoring unit 313 notifies the coordination apparatus 100 that a failure has occurred.

In step S103, the service state management unit 110 of the coordination apparatus 100 receives a notification and inquires the state of a service from the server 310.

In step S104, the service monitoring unit 312 of the server 310 receives an inquiry of the state of the service and reports the state of the database service unit 311 (not illustrated in FIG. 5) (whether or not the database service unit 311 is operating normally) to the coordination apparatus 100.

In step S105, the service state management unit 110 proceeds to step S107 when the database service unit 311 is operating normally (step S105→OK) and proceeds to step S106 when the database service unit 311 is not operating normally (step S105→NG).

The database service unit 311 is not operating normally at a point in time when the processing proceeds to step S106, and thus processing for performing switching to the server 320 of the standby system is executed. This switching processing is similar to that in steps S921 to S925 illustrated in FIG. 3.

In step S107, the service state management unit 110 instructs the API order execution management unit 120 to restart a service of the standby system.

In step S108, the API order execution management unit 120 instructs the server 320 of the standby system to restart a service.

In step S109, the service recovery unit 324 of the server 320 of the standby system receives an instruction and instructs the database service unit 321 to be restarted.

In step S110, the database service unit 321 is restarted.

Features of Coping with Split Brain Problem

In a case where a heartbeat is stopped and a service of the active system is operating, the service continuation system 10 restarts a service of the standby system. Thereby, the service continuation system 10 can prevent a service from being operated in duplicate in both the active system and the standby system and can prevent data on the storage 330 from being damaged.

In the related art, a service recovery unit of a server of an active system forcibly restarts a server of a standby system using an IPMI. In a cloud environment, an API for operating a server (hardware) is not generally provided and cannot be restarted. On the other hand, the service continuation system 10 can restart the service of the standby system. In addition, the database service unit (process) is restarted, and thus it is possible to terminate restart processing in a shorter period of time than when the server of the standby system which is a virtual machine is restarted. For this reason, in the service continuation system 10, it is possible to reduce a stop time of the service of the standby system and reduce a period of time for which switching to the standby system cannot be performed.

Modification Example of Coping with Split Brain Problem

The service monitoring unit 312 of the active system reports the state of the database service unit 311 with respect to an inquiry (step S103) of the coordination apparatus 100 (step S104). On the other hand, the service monitoring unit 312 may report the state of the database service unit 311 together with the notification of the occurrence of a failure which is given from the node monitoring unit 313 (step S102). In this manner, the service continuation system 10 can more rapidly execute the process of step S105 and the subsequent processes.

In a case where a heartbeat is stopped and the service of the active system is operating the service continuation system 10 restarts the service of the standby system to prevent a service from being operated in duplicate. On the other hand, the coordination apparatus 100 may notify the server 320 of the standby system that the service of the active system is operating so that the service recovery unit 324 of the standby system does not perform switching processing (steps S923 to S925 illustrated in FIG. 3).

In switching processing (step S106), the server 320 of the standby system detects the stopping of a heartbeat (step S921 illustrated in FIG. 3), so that switching processing (steps S923 to S925 illustrated in FIG. 3) is started. On the other hand, the API order execution management unit 120 may instruct the server 320 to cause the service recovery unit 324 to start switching processing (steps S923 to S925 illustrated in FIG. 3).

In the above-described embodiment, the database service unit 321 is restarted in the server 320 of the standby system in response to an instruction received from the coordination apparatus 100. Alternatively, the service recovery unit 324 may restart an OS of the server 320 of the standby system. The service recovery unit 324 may restart the database service unit 321, or may restart the OS in a case where the service recovery unit 324 fails in the restarting of the database service unit 321. The above-described restart of the service or the OS is also referred to as system restart (of the standby system).

In a case where system restart is not successful, the coordination apparatus 100 may (instruct a management system in a virtualization environment to) restart the server 320 of the standby system using an API of a virtual machine service. Meanwhile, whether or not the system restart is successful can be determined by monitoring operation conditions of the server 320 of the standby system using an API of a virtual machine service.

In the above-described embodiment, the service monitoring unit 312 gives a notification to the coordination apparatus 100 when a heartbeat is stopped and a failure is detected. On the other hand, when the database service unit 311 is operating, the service monitoring unit 312 may instruct the server 320 of the standby system to perform system restart without giving a notification to the coordination apparatus 100, or may restart the server 320 using an API of a virtual machine service. Alternatively, the service monitoring unit 312 may instruct the server 320 of the standby system to perform system restart. In a case where the system restart is not successful, the service monitoring unit 312 may instruct a management system in a virtualization environment to restart the server 320 using an API of a virtual machine service. In either case, a split-brain problem can be avoided without performing switching to the standby system. Meanwhile, the above-described restart instructing processing of the service monitoring unit 312 may be executed by the service recovery unit 314.

Coping with Service Stop Failure

Figure 6:
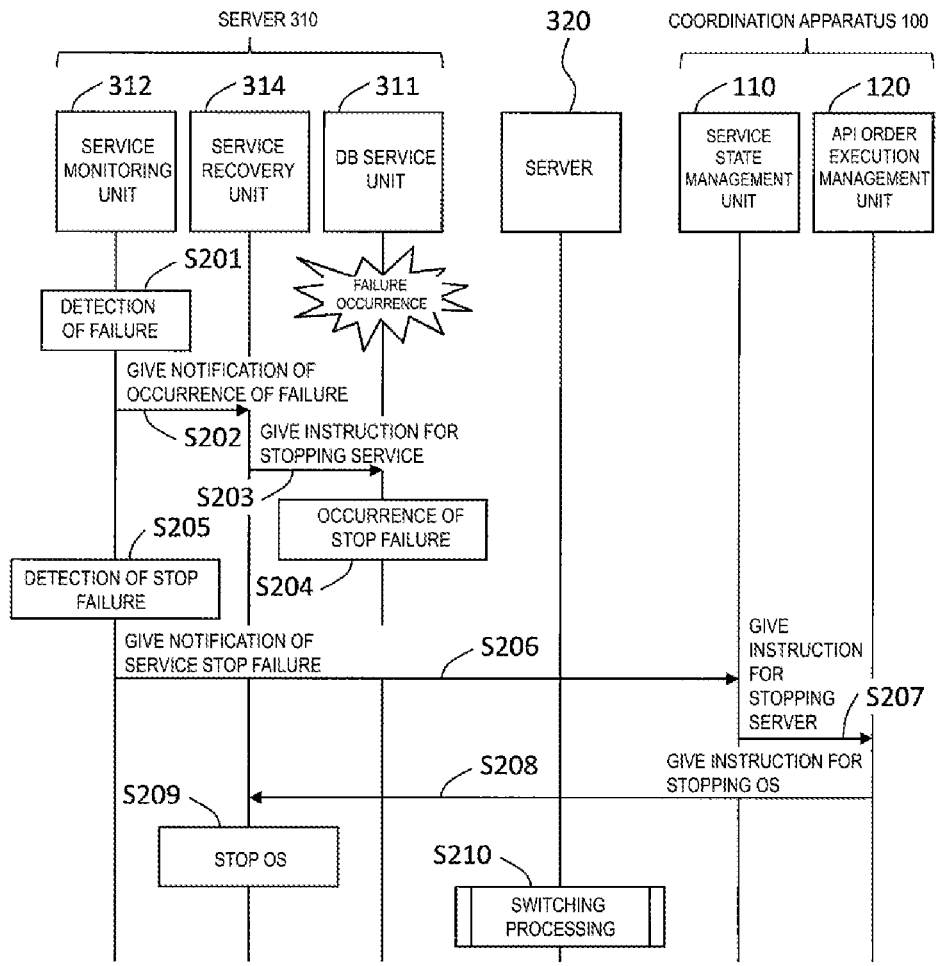
FIG. 6 is a sequence diagram illustrating coping processing when a service stop failure of the service continuation system according to the present embodiment occurs.

FIG. 6 is a sequence diagram illustrating coping processing when a service stop failure of the service continuation system 10 according to the present embodiment occurs. A flow of processing in a case where a failure occurs in a service in the server 310 of the active system and a service stop failure occurs (see step S204 to be described later) will be described with reference to FIG. 6.

The processes of steps S201 to S203 after a failure has occurred in the database service unit 311 are similar to the processes of steps S901 to S903 illustrated in FIG. 2.

In step S204, a service stop failure in which a service cannot be stopped occurs in the database service unit 311.

In step S205, the service monitoring unit 312 detects a service stop failure.

In step S206, the service monitoring unit 312 notifies the coordination apparatus 100 of a service stop failure.

In step S207, the service state management unit 110 receives a notification and instructs the API order execution management unit 120 to stop the server 310 of the active system.

In step S208, the API order execution management unit 120 instructs the server 310 of the active system to stop an OS of the server 310.

In step S209, the service recovery unit 314 of the server 310 of the active system receives an instruction and stops the OS (not illustrated) of the server 310.

In step S210, the server 320 of the standby system executes switching processing. This switching processing is similar to that in steps S921 to S925 illustrated in FIG. 3.

Features of Coping with Service Stop Failure

In a case where a failure has occurred in a service in the active system and a service stop failure has occurred, the service continuation system 10 stops the OS of the server 310 of the active system. Thereby, the service continuation system 10 can switch the active system to the standby system and continue providing a service.

In the related art, a service recovery unit of a server of an active system forcibly stops or restarts the server (hardware) of the active system using an IPMI. In a cloud environment, an API for operating a server (hardware) is not generally provided and cannot be restarted. In the service continuation system 10, the OS is stopped, and thus it is possible to prevent a file system from being damaged due to forcible stopping of a server, or the like and to more rapidly recover the server 310.

Modification Example of Coping with Service Stop Failure

In a case where a service stop failure has occurred, the coordination apparatus 100 instructs the server 310 of the active system to stop the OS the server 310. In a case where the OS is not stopped within a predetermined period of time after the instruction is given, the coordination apparatus 100 may (instruct a management system in a virtualization environment to) stop the server 310 using an API of a virtual machine service. Meanwhile, whether or not the server 310 of the active system has stopped can be determined by monitoring operation conditions of the server 310 using an API of a virtual machine service. Further, in a case where a virtual machine of the server 310 is not stopped within a predetermined period of time and a cloud provider is providing an API for restarting a hypervisor, the hypervisor in which the virtual machine of the server 310 is operating may be restarted using the API.

In a case where there are a plurality of methods for stopping a service instructed by the service recovery unit 314 (see step S203 illustrated in FIG. 6), the database service unit 311 may be stopped using a method (a second service stop instruction) different from the method in step S203 (a first service stop instruction), instead of stopping an OS (see steps S208 to S209 illustrated in FIG. 6). Alternatively, the service recovery unit 314 may instruct the database service unit 311 to stop a service using a method different from the method in step S203 and may stop the OS in a case where the service is not stopped. The service stop and the OS stop are also referred to as (active system) system stop.

In the switching processing (step S210), the server 320 of the standby system detects the stopping of a heartbeat (step S921 illustrated in FIG. 3), so that the switching processing (steps S923 to S925 illustrated in FIG. 3) is started. On the other hand, the API order execution management unit 120 may instruct the server 320 to cause the service recovery unit 324 to start switching processing (steps S923 to S925 illustrated in FIG. 3).

In the above-described embodiment, the service monitoring unit 312 gives a notification to the coordination apparatus 100 when a service stop failure is detected. On the other hand, the service recovery unit 314 may be notified to stop the OS without giving a notification to the coordination apparatus 100. Alternatively, the server 310 may be stopped using an API of a virtual machine service. A heartbeat is stopped in either case, and thus switching to the server 320 of the standby system is performed (see step S210 in FIG. 6).

Modification Example: Plurality of High Availability Cluster Systems

In the above-described embodiment, a cluster is constituted by a pair of servers. One coordination apparatus may correspond to a plurality of active systems and standby systems which are paired. In this case, the coordination apparatus associates identification information of a server, a network address, and the like with each other for each pair and stores the associations in a storage unit (not illustrated) as cluster configuration information. In a case where the coordination apparatus has received a notification of a failure from a server of the active system, the coordination apparatus instructs a server of the standby system corresponding to the server of the active system having given the notification to restart a service with reference to the cluster configuration information (see S108 in FIG. 5).

Modified Example: High Availability Clustering of Coordination Apparatus in the above-described embodiment, the coordination apparatus 100 is configured as one physical server or a virtual machine on a cloud, but the coordination apparatus itself may be configured as a cluster so as to be duplicated into an active system and a standby system and have high availability. In this case, a coordination apparatus for a cluster configuration, which is a coordination apparatus, may be provided, or a coordination apparatus for a cluster configuration may not be provided while disregarding a split-brain problem and a service stop failure in the coordination apparatus. In addition, the coordination apparatus and the standby system may be provided together in one virtual machine.

Modification Example: Operation Environment of Service Continuation System The servers 310 and 320 and the coordination apparatus 100 may be virtual machines provided by the same cloud provider, may be virtual machines in different regions (or availability zones) of the same cloud provider, or may be virtual machines provided by different cloud providers. A server of a standby system and a server of an active system may be installed in different regions, different availability zones, or different cloud providers, so that it is possible to reduce the risk of simultaneous occurrence of failures in the active system and the standby system due to power interruption, communication interruption, disaster, or the like.

In addition, both or either one of the servers 310 and 320 may be a bare metal server rather than a virtual machine. For example, a server of an active system is configured as a bare metal server, so that it is possible to eliminate overhead due to virtualization technology and more efficiently provide a service.

When the node monitoring units 313 and 323 do not receive a heartbeat for a predetermined period of time, the node monitoring units determine that a failure has occurred in servers of the opponents. On the other hand, when servers of an active system and a standby system are installed in different regions, different availability zones, or different cloud providers, there is a possibility that a period of time (transfer time) between the transmission and reception of a heartbeat may vary due to the influence of network congestion. In consideration of this, the node monitoring units 313 and 323 may change a period of time until it is determined that a failure has occurred after the reception of a heartbeat is stopped, in accordance with a transfer time of a heartbeat before the reception of a heartbeat is stopped. The transfer time can be measured by including the time of transmission in a heartbeat.

REFERENCE SIGNS LIST

- 10 Service continuation system
- 100 coordination apparatus
- 110 Service state management unit (coordination control unit)
- 120 API order execution management unit (coordination control unit)
- 310 Server (active system virtual server)
- 311 Database service unit (active system service unit)
- 312 Service monitoring unit (active system service monitoring unit)
- 313 Node monitoring unit (active system node monitoring unit)
- 314 Service recovery unit (active system service recovery unit)
- 320 Server (standby system virtual server)
- 321 Database service unit (standby system service unit)
- 322 Service monitoring unit (standby system service monitoring unit)
- 323 Node monitoring unit (standby system node monitoring unit)
- 324 Service Recovery unit (standby system service recovery unit)

The invention claimed is:

1. A service continuation system comprising:
   an active system virtual server configured to provide a service through a network;
   a standby system virtual server configured to transmit a heartbeat to and receive a heartbeat from the active system virtual server and provide the service in a case where a heartbeat from the active system virtual server is stopped; and
   a coordination apparatus which is communicatively connected to the active system virtual server and the standby system virtual server,
   wherein the active system virtual server includes
   an active system service unit, including one or more processors, configured to provide the service,
   an active system node monitoring unit, including one or more processors, configured to notify the coordination apparatus of the stopping of a heartbeat in a case where a heartbeat from the standby system virtual server is not received for a predetermined period of time, and
   an active system service monitoring unit, including one or more processors, configured to report whether or not the active system service unit is operating to the coordination apparatus,
   the standby system virtual server includes
   a standby system service unit, including one or more processors, configured to provide the service, and
   a standby system service recovery unit, including one or more processors, configured to execute a system restart, in response to receiving a restart instruction from the coordination apparatus, including (i) restart of the standby system service unit, and (ii) restart of an operating system of the standby system virtual server after the restart of the standby system service unit is not successful, and
   the coordination apparatus includes a coordination control unit, including one or more processors, configured to send the restart instruction to the standby system virtual server in a case where the stopping of a heartbeat is received and a report indicating that the active system service unit is operating is received from the active system virtual server, wherein the coordination apparatus is further configured to:
   determine that the restart of the operating system of the standby system virtual server fails, and
   instruct a management system in a virtualization environment in which the standby system virtual server is operated to restart the standby system virtual server, thereby causing the standby system virtual server to be restarted.

2. The service continuation system according to claim 1, wherein
   the active system virtual server further includes an active system service recovery unit including one or more processors,
   the active system service monitoring unit detects a service stop failure indicating that the active system service unit is not able to stop the service and notifies the coordination apparatus of the detection of the service stop failure,
   the coordination control unit instructs the active system virtual server to stop the system in a case where the service stop failure is received from the active system virtual server, and
   the active system service recovery unit executes stopping of the operating system of the active system virtual server in a case where an instruction for stopping the system is received from the coordination apparatus.

3. The service continuation system according to claim 2, wherein in a case where the active system service recovery unit fails in the stop of the operating system of the active system virtual server, the coordination apparatus instructs a management system in a virtualization environment in which the active system virtual server is operated to stop the active system virtual server.

4. The service continuation system of claim 1, wherein:
   the active system service monitoring unit is configured to detect a service stop failure indicating that the active system service unit is not able to stop the service and notifies the coordination apparatus of the detection of the service stop failure,
   the active system virtual server further comprises:
   an active system service recovery unit, including one or more processors, configured to execute stopping of an operating system of the active system virtual server in a case where an instruction for stopping the system is received from the coordination apparatus, and
   the coordination control unit is configured to instruct the active system virtual server to stop the system in a case where the service stop failure is received from the active system virtual server.

5. The service continuation system of claim 1, wherein:
   in a case where the active system virtual server does not receive a heartbeat from the standby system virtual server for a predetermined period of time and the service is operating, the active system virtual server, including one or more processors, is configured to:

execute (i) instructing the standby system virtual server to restart the system of the standby system virtual server, and (ii) instructing a management system in a virtualization environment in which the standby system virtual server is operated to restart the standby system virtual server after the restart of the system is not successful, and the standby system virtual server includes one or more processors configured to execute (i) restart of a process for providing the service, and (ii) restart of an operating system of the standby system virtual server after the restart of the process is not successful, in a case where an instruction for restarting the system is received.

6. The service continuation system of claim 1, wherein the active system service monitoring unit is configured to detect a service stop failure indicating that the active system service unit is not able to stop the service, and further comprising:

an active system service recovery unit, including one or more processors, configured to execute any one of stopping an operating system of the active system virtual server and instructing a management system in a virtualization environment in which the active system virtual server is operated to stop the active system virtual server, in a case where the active system service monitoring unit has detected the service stop failure.

7. A service continuation method of a service continuation system including an active system virtual server configured to provide a service through a network, a standby system virtual server configured to transmit a heartbeat to and from the active system virtual server and provide the service in a case where a heartbeat from the active system virtual server is stopped, and a coordination apparatus which is communicatively connected to the active system virtual server and the standby system virtual server, the service continuation method comprising:

at the active system virtual server,
providing the service,
determining that a heartbeat from the standby system virtual server is not received for a predetermined period of time;
notifying the coordination apparatus of the stopping of the heartbeat, and
reporting whether or not the service is operating to the coordination apparatus;
at the standby system virtual server,
receiving a restart instruction from the coordination apparatus;

executing a system restart, in response to receiving the restart instruction from the coordination apparatus, including (i) restart of the service of the standby system virtual server, and (ii) restart of an operating system of the standby system virtual server after the restart of the service of the standby system virtual server is not successful; and at the coordination apparatus,
receiving, from the active system virtual server, (i) a notification of the stopping of the heartbeat, and (ii) a report indicating that the service is operating;
sending the restart instruction to the standby system virtual server,
determining that the restart of the operating system of the standby system virtual server fails, and
instructing a management system in a virtualization environment in which the standby system virtual server is operated to restart the standby system virtual server, thereby causing the standby system virtual server to be restarted.

8. The service continuation method according to claim 7, further comprising:

at the active system virtual server,
detecting a service stop failure indicating that the active system virtual server is not able to stop the service and notifying the coordination apparatus of the detection of the service stop failure,
at the coordination apparatus,
instructing the active system virtual server to stop the system in a case where the service stop failure is received from the active system virtual server, and
at the active system virtual server,
executing stopping of the operating system of the active system virtual server in a case where an instruction for stopping the system is received from the coordination apparatus.

9. The service continuation method according to claim 8, further comprising:

at the coordination apparatus,
in a case where the active system virtual server fails in the stop of the operating system of the active system virtual server, instructing a management system in a virtualization environment in which the active system virtual server is operated to stop the active system virtual server.

* * * * *